Feb. 20, 1951 D. M. L. FORBES 2,542,498
METHOD AND APPARATUS FOR FLAME CHOPPING
AND CULTIVATION OF GROWING CROPS
Filed Oct. 18, 1945 3 Sheets-Sheet 1

INVENTOR
DAVID M. L. FORBES
BY
Pennie, Davis, Marvin & Edmonds
ATTORNEYS

Feb. 20, 1951 D. M. L. FORBES 2,542,498
METHOD AND APPARATUS FOR FLAME CHOPPING
AND CULTIVATION OF GROWING CROPS
Filed Oct. 18, 1945 3 Sheets-Sheet 2

INVENTOR
DAVID M. L. FORBES
BY
ATTORNEYS

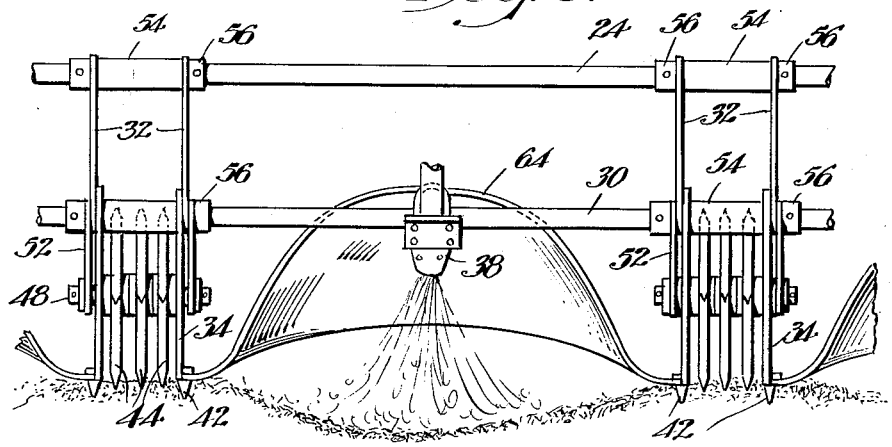
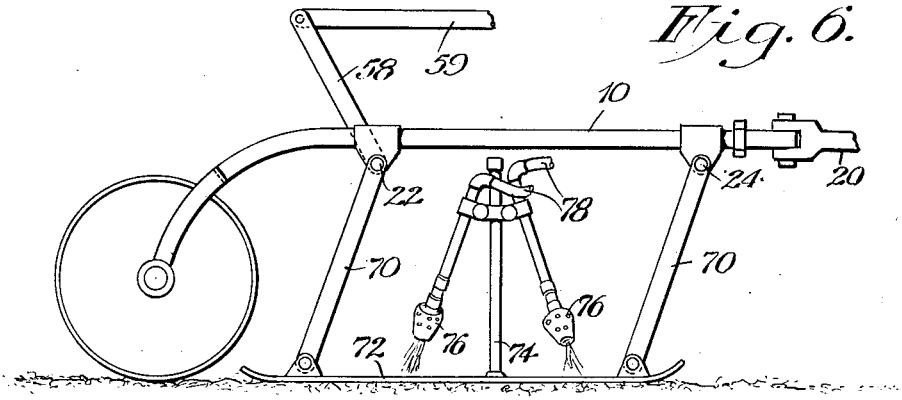
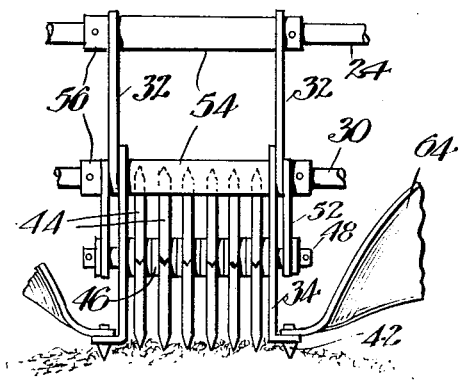

Patented Feb. 20, 1951

2,542,498

UNITED STATES PATENT OFFICE 2,542,498

METHOD AND APPARATUS FOR FLAME CHOPPING AND CULTIVATION OF GROWING CROPS

David M. L. Forbes, Kamuela, Territory of Hawaii, assignor, by mesne assignments, to Flame Cultivation, Incorporated, New York, N. Y., a corporation of Maryland Application October 18, 1945, Serial No. 623,005

11 Claims. (Cl. 47—58)

My invention relates to improvements in methods and apparatus for the flame chopping and cultivation of growing crop plants, more particularly in the early stages of the plant growth.

The problem of handling row crops, in the early stages of growth, such as cotton, beets and other row crops, without the use of hand labor to a large extent, has been partially solved by the use of certain mechanical equipment for between-row cultivation and for chopping or blocking rows of plants. The problem of economically handling large acreages of crops, such as cotton in the early stages of growth, has not been completely solved because of the lack of effective means for simultaneously controlling weeds in the rows of plants as well as between the rows. Flaming has been proposed for between-row control of weeds but so far as known, no satisfactory overall process or apparatus has been devised to handle growing crop plants effectively during the early stages of growth. In the later stages of growth, weeds have been effectively controlled not only between the rows but also within the rows of growing plants, by cross-flaming. Such a procedure, however, cannot be employed while the growth crop plants are young and tender.

According to an important feature of my invention, I have discovered that an important phase of the handling of row crop plants in their early stages of growth, and particularly the chopping of such plants may be accomplished by mechanical equipment operating crosswise of the rows of plants by simultaneously flaming the plants which are desirably eliminated, and cultivating the retained plants in a shielded zone in which they are protected from nearby flaming operations on the plants to be eliminated. The process is preferably carried out so that the retained blocks of plants are cultivated by means of a rotary hoeing operation in such a manner that the weeds surrounding the retained plants are largely pulled or cut out.

According to my invention, I have discovered that this combined chopping and cultivating operation may be accomplished by a cultivating machine provided with a plurality of spaced parallel flaming units alternating with rotary hoe cultivators, the flame units including a burner or burners, a pair of vertical shields extending alongside the burner of each unit to shield the retained plants, and a cowling mounted between the shields to direct the flame and hot gases downward onto the crop plants to be eliminated, as well as onto the weeds growing within the area covered by the flaming unit. This machine is drawn crosswise of the plant rows so that the alternate spaced flaming units block out and eliminate the plants to be destroyed, while the shields and rotary hoe cultivator, respectively, protect and cultivate the retained plants.

According to another feature of my invention, I have discovered that the machine referred to above can be so constructed that while in the cross-chopping operation, the rotary hoe cultivators are relatively closely spaced together, the machine may be quickly changed so that the spacing is such that the rotary hoes will take care of the rows of crop plants while the flaming units control the weeds between rows. In this operation the machine will be drawn parallel with the rows of plants, and the rows of plants will be protected from the hot gases and flames of the flaming units by the vertical shields comprising a part of the apparatus.

My invention contemplates a method of procedure by which extremely young growing crop plants may be cultivated by a rotary hoeing operation carried out simultaneously with a between-row flame cultivation both before and after chopping and prior to the time when the crop plants are of sufficient size and toughness for their stems to withstand flame cultivation in which flames are passed crosswise of the plant rows. By employing the methods of the present invention, large areas of plants, such as cotton, beets, and other crops, may be effectively handled in a very economical manner by the use of a few machines.

According to a preferred procedure, the rows of growing crop plants are cultivated by parallel cultivation as soon as weeds begin to appear in sufficient numbers to warrant the cultivating operation, this first procedure including the rotary hoe cultivation of the rows of crop plants combined with the simultaneous between-row flaming while shielding the crop plants from the flame and hot gases. This operation may be repeated if necessary up until the time the plants are ready for chopping, when the apparatus is set with the flaming units at the proper spacing and then drawn crosswise of the rows to chop or block the rows by a protected flame operation which does not injure the retained plants, and simultaneously rotary-hoeing the plants retained in the chopping operation. After the chopping is completed, the units of the apparatus are then respaced and the parallel cultivation carried out with simultaneous between-row flaming and row-hoeing with the rotary hoe which pulls out weeds and cultivates the young crop plants. This latter operation may be repeated until the plants are old enough for cross-flaming.

The method of the present invention is particularly adapted for the handling of deep or tap-rooted plants of the type of cotton in which the root extends directly downward and is not substantially affected by the tines of the rotary hoe. When such plants are subjected to a rotary hoeing operation, the curved tines of the rotary hoe dig slightly into the soil surface or cake surrounding the crop plants and uproot the obnoxious weeds, which are for the most part fibrous rooted, or dislocate them from intimate soil contact. Weeds which are not fibrous rooted at the early stages of plant cultivation are usually very succulent so that they are eliminated, whereas the tap-rooted crop plants are not seriously disturbed by the rotary hoeing operation.

My invention includes other features, objects and advantages which will be apparent to those skilled in the art from the following more detailed description thereof taken in connection with the accompanying drawings which form a part of this application.

In the drawings:

Fig. 5 is a broken front view of a portion of the apparatus shown in Fig. 4.

Fig. 6 is a side view illustrating a modified form of apparatus employing substantially the frame work shown in Figs. 1 and 4.

Fig. 7 is a detailed view of the rotary hoe construction.

Figure 1:
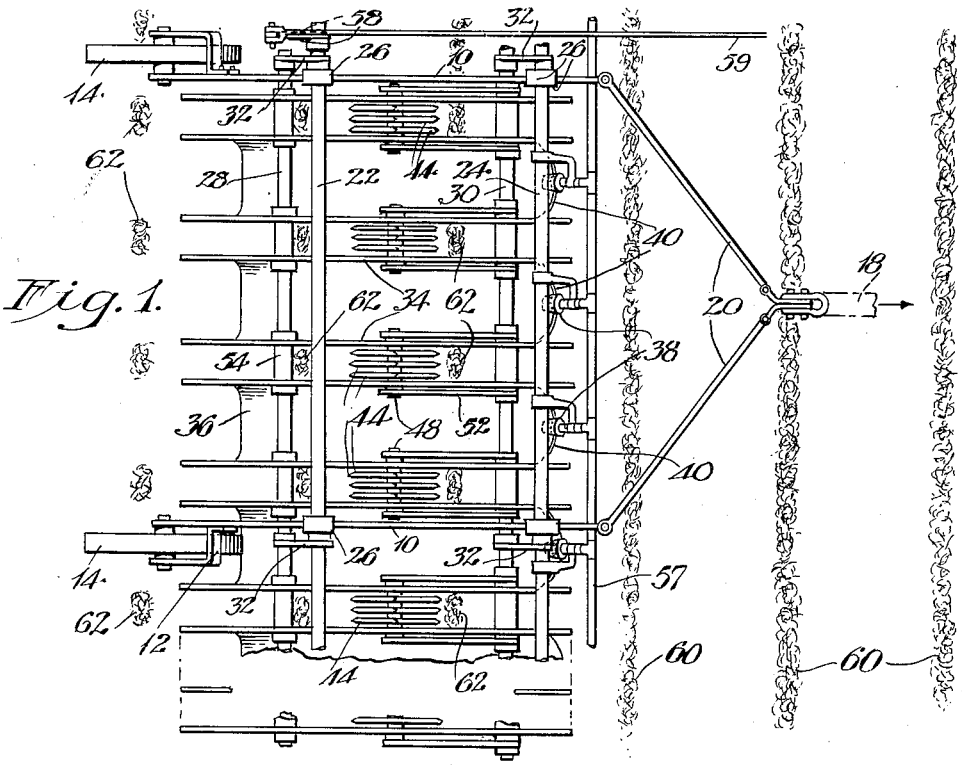
Fig. 1 is a broken view looking down on an apparatus constructed in accordance with the features of the present invention, for cross-chopping or cross-blocking and cultivating rows of growing plants.
Figure 2:
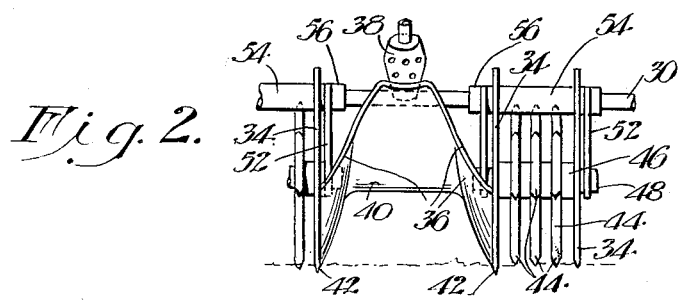
Fig. 2 is a broken front view of a portion of the apparatus shown in Fig. 1, illustrating a preferred form of flame chopping and cultivating elements.
Figure 3:
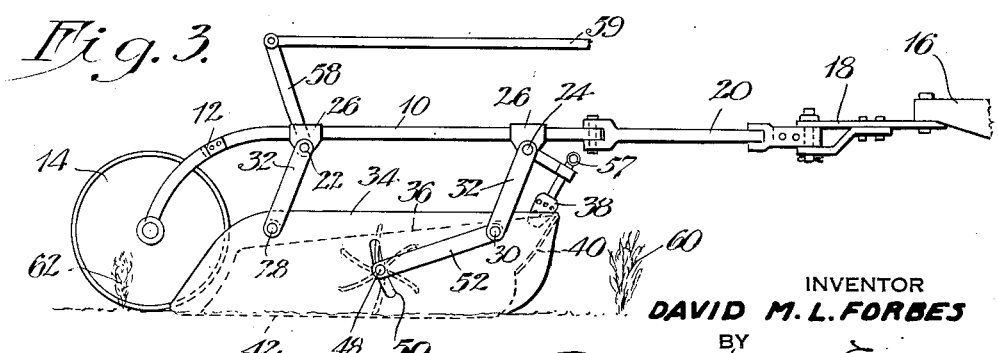
Fig. 3 is a side view of the apparatus shown in Fig. 1 with parts broken away to simplify the showing.

Referring to Figs. 1, 2 and 3 of the drawings which show an apparatus which is particularly adapted for cross chopping of rows of growing plants by a combination procedure of flaming and cultivation, the improved apparatus comprises a pair of main flame elements or beams 10 extending in the direction of movement of the apparatus and connected by the usual Y- or fork-structure 12 to wheels 14. The apparatus shown in these figures of the drawings is a trailing unit which may be drawn by a tractor 16 (Fig. 3) or by other power means connected by a draw bar 18 to a pair of hinged bars 20, respectively connected to the main beams 10 by hinged connections. The hinged arrangement of the bars 20 to the beams 10 permits the modification of the apparatus to a different spacing for the flaming units. As shown in Fig. 1, the apparatus includes a pair of main supporting bars 22 and 24 which may be of tubing and which extend through appropriate holes in brackets 26 attached to the main beams 10. The bars 22 and 24 are held in place by means of set screw rings or other means.

The frame members 10, 22 and 24 are mounted considerably above the ground, and are used to support the flame blocking units and rotary hoe units comprising a part of the apparatus, these elements being mounted on lower shafts 28 and 30, arranged parallel to the shafts 22 and 24, and supported thereon by spaced links or bars 32, of equal length, so that a parallelogram effect is obtained, as indicated in Fig. 3 of the drawings. The shafts or bars 28 and 30 are supported from the bars 22 and 24, respectively, by means of the links 32.

Each flame blocking unit, of which a number are shown in Fig. 1 of the drawings, comprises a pair of spaced shields 34, for example, of sheet steel, having approximately the sleigh-runner shape shown in Fig. 3 of the drawings. As indicated in Figs. 2 and 3, these shields are provided with holes in their upper portion through which the floating cross beams or tubes 28 and 30 extend. The holes are parallel to the bottom edges of the shields 34. A cowling 36 is mounted between and attached to adjacent shields 34 for the purpose of directing the hot gases of combustion from the flaming operation down to the ground, the cowling sloping toward the ground from front to back, as shown in Fig. 3 of the drawings. Tubular support 30 also extends through the upper part of the cowling, as indicated in Fig. 3.

A burner 38 is mounted in the upper front part of each of the cowlings 36, in a position so as to direct the flame toward the back and under the cowling. A front baffle 40 is also provided in front of the burner 38 between the front portions of the cowling in order to reduce the loss of heat in the operation, and concentrate that heat produced by the burners onto the weeds and plants under the cowling. Each of the shields 34 is provided with a deep keel 42 which may be integral with the shield or attached thereto in conjunction with the cowling. If desired, the cowling may include the keels 42, and also may provide a shoulder on which the bottom of the shield 34 rests. The keels 42 are adapted to sink deeply into the soil and thereby augment the effect of the shields 34 in retaining the heat from the burner 38 to the area between the shields, and prevent injury to plants outside the shields 34.

Alternating with the burner units I provide a rotary hoe for the cultivation and weeding of the retained crop plants, this hoe comprising a plurality of hoeing or cultivating elements comprising a series of curved tines 44 mounted on, and rotating with, a disk hub 46, the hub or hubs of the hoe units being mounted on a shaft 48 which is approximately midway between the tubular cross supports 28 and 30. The hoe unit is mounted between a pair of the spaced shields 34 with the shaft 48 extending through a slot 50 and having its ends supported by links 52 spaced by washers on the outside of the adjacent shields 34, as shown, for example, in Fig. 2 of the drawings. The shields 34 between which the rotary hoes are mounted, are held in spaced relation by means of spacing sleeves 54 on the bars 28 and 30, while the links 52 are held in place and properly spaced by means of set screw rings or clamps 56. Sleeves of proper length may be used in place of the set screw rings, if desired.

The burners 38 may be supported by any suitable means as, for example, by a bracket extending from the tubular support member 24, as shown in Fig. 3. Fuel for the burners, and air, if desired, may be supplied thereto in a known manner, the fuel, for example, being bottled gas.

such as propane or butane, which may be supplied through a fuel line 57, while the fuel tank will or will not be carried by the tractor 16 and fuel conducted to the line 57 by a suitable hose connection, not shown.

The shields 34 as well as the rotary hoe units carried by the cross bars 22 and 24 comprise floating units which may be elevated substantially above the ground by means of an arm 58 fixed to the cross bar 22, and operated by a draw bar 59, with spring linkage which allows the floats to move so many degrees without positive lift effect. The supporting links 32 between the bar 28 and the bar 22 are preferably fixed to the bar 22 or arranged with a dog so that the rotation of the bar 22 by the arm 58 will swing the floating units back and elevate the units attached to the cross bars 28 and 30.

The apparatus shown in Figs. 1, 2 and 3 is particularly adapted and arranged for the flame chopping of rows of growing crop plants, the apparatus being arranged so that the shields 34 on opposite sides of each rotary hoe serve to protect the crop plants therebetween, while the burners 38 destroy the weeds and the crop plants under the cowlings 36. The spacing from center to center, therefore, of the rotary hoes, should be equal to the distances desired between plants or groups of plants to be left in the crop row. For example, the spacing may be fifteen inches from center to center of the rotary hoes, while the shields enclosing each rotary hoe may be approximately five inches apart. In carrying out a flame chopping or cross blocking operation, the apparatus is drawn crosswise of the crop rows 60, as shown in Fig. 1, so that the burners 38 destroy alternating sections of the plants in each row, as well as any weeds which may be present in the areas corresponding to such sections. This flame chopping operation leaves spaced groups of plants 62 in each row which are cultivated and weeded by the rotary hoes.

The rotary hoe is useful in the cultivation and weeding of young growing crop plants, particularly of the type of cotton, which is a tap-rooted plant. This type of hoe is effective against the obnoxious weeds which usually grow in association with the plants at the early stages of growth, since they, for the most part, are fibrous or surface rooted, so that the tines of the rotary hoe can effectively remove them without seriously damaging the crop plants such as cotton which has a tap root. The roots of some of these weeds are relatively close to the surface so that they will be uprooted by the action of the rotary hoe.

At the time of the blocking or flame chopping operation, the crop plants are usually too young for flame cultivation, so that the simultaneous flame chopping and cultivation of the retained plants is effectively accomplished by the apparatus of the present invention. The rotary hoe in its operation penetrates the surface of the soil to a slight depth, and while rotating, tends to break up and lift the soil and any surface rooted weeds. The cotton plant is sufficiently resilient and resistant to the operation of the rotary hoe to come through with only relatively slight damage in such an operation. In fact, the rotary hoe cultivation may continue until the crop plants are sufficiently large for the use of flame cultivation processes. The apparatus, therefore, provides a suitable mechanical means for cultivating crop plants in the early stages and for destroying weeds while the plants are too young to withstand flame cultivation processes. However, the rows of growing crop plants will only be subjected to one flame blocking operation in which the apparatus is drawn crosswise of the rows.

Figure 4:
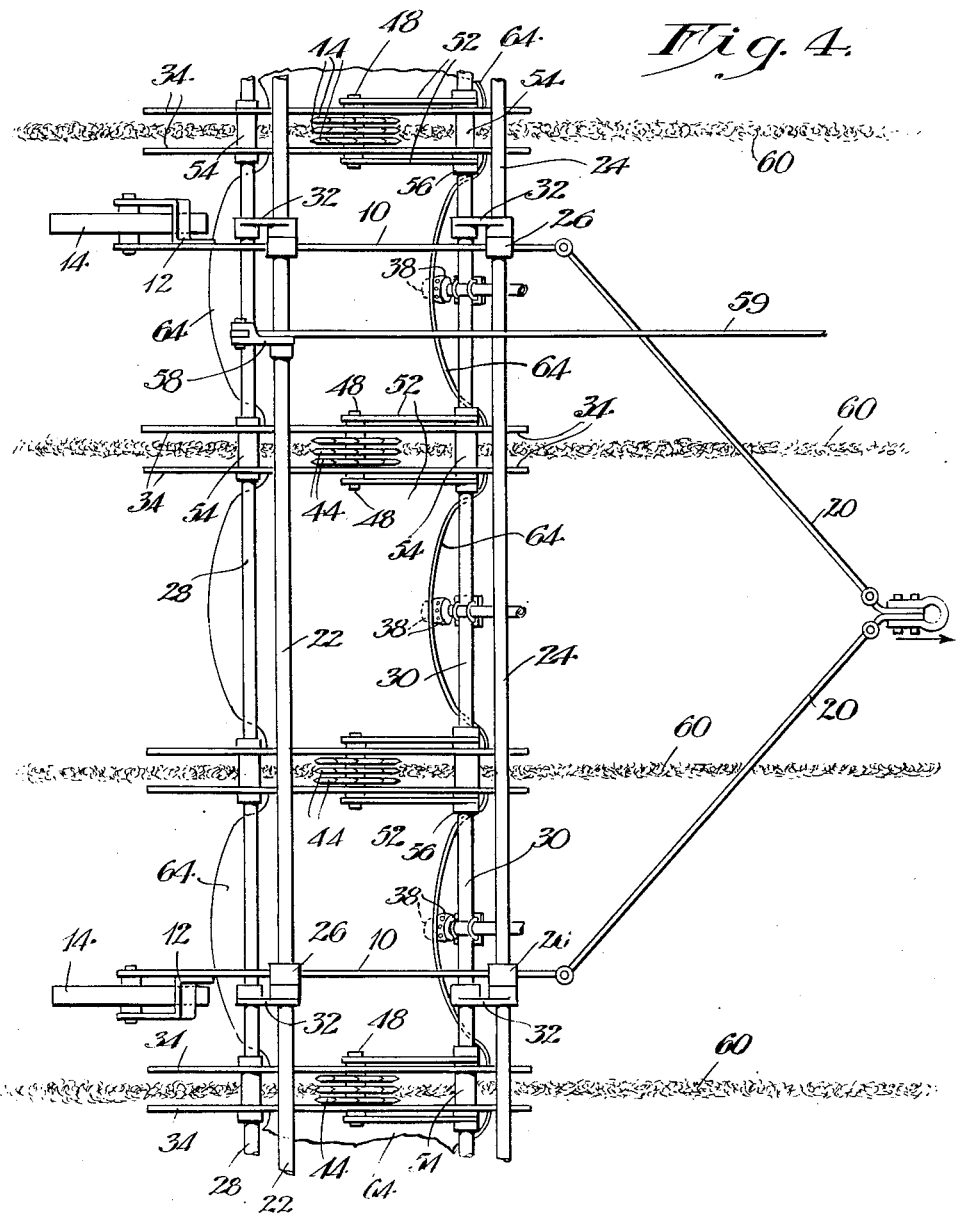
Fig. 4 is a view similar to that of Fig. 1 showing an arrangement of the apparatus of the present invention in which the rotary hoe cultivator is combined with flame cultivation means for parallel cultivation.

Fig. 4 of the drawings illustrates a slightly modified arrangement of the apparatus particularly adapted for the flame cultivation of relatively young crop plants. In this figure of the drawings, it will be noted that the apparatus has been modified from that shown in Fig. 1 to increase the spacing from center to center of the rotary hoe units to a distance equal to that between the rows 60 of growing crop plants. For example, the center-to-center distances may be forty inches, and the different spacings may be accomplished by the use of spacing sleeves or set screw rings or clamps, employing the same framework as shown in Fig. 1, and also the same shields and rotary hoes. The principal change in the apparatus of Fig. 4, from that in Fig. 1, is the provision of a relatively wide cowling 64 to direct the flame and hot gases toward the ground in the spaces between the rows of growing plants. The shields 34 protect the rows of growing crop plants from the flame and hot gases from the burners.

Simultaneously with the between-row flame cultivation, the rotary hoes cultivate and weed the crop plants in the rows 60, or the groups of crop plants 62, and uproot weeds which may have grown between groups 62 in the row.

In rearranging the apparatus shown in Fig. 1 to that shown in Fig. 4, the spacing of the beams 10 may be different, and this is readily taken care of because of the hinged connections between the beams 10 and the bars 20.

Fig. 5 shows somewhat more in detail the arrangement of the cowling 64 between adjacent rotary hoe units, the cowling being bolted or otherwise attached to the lower portions of the shields 34 so as to provide a comparatively rigid arrangement, although it will be understood that the entire lower portion of the apparatus swings on the links 32 so that it may be said to be a floating unit adapted to move up or down in accordance with any irregularities in the ground being worked. In both forms of the apparatus, the cowling is of considerable importance because it concentrates the flame and hot gases onto the weeds, or weeds and plants, in the particular area desired, and therefore reduces the cost of fuel. A pair of the links 32 at each hoe unit are shown in Fig. 5, for supporting the swinging units comprising the hoes, shields and cowlings.

Fig. 6 of the drawings illustrates a further modification which may be made by using the primary framework of the apparatus shown in Figs. 1 to 5. According to this showing, the main frame comprising the elements 10, 12, 14, 16, 20, 22 and 24, as well as the burners and certain auxiliary equipment, may be used to provide an apparatus for carrying out a straight flame cultivation operation. For example, a series of parallel skid units may be hung on the tubular cross beams 22 and 24, by a pair of links 70 which are pivoted to opposite ends of a skid or runner 72, the pivoting being effected in such a manner that the skids 72 will not turn sidewise.

The series of skid units carried by bars 22 and 24 will be spaced so that they center between the rows of growing plants while each skid unit is provided with a post 74 carrying burners 76, directed against the rows of growing crop plants on either side of the skids 72. The burners may be supplied with fuel such as bottled propane or butane through fuel lines 78, although air and fuel oil may be supplied to the burners in the usual manner, if desired. The flaming may be carried out according to accepted practice with the skids 72 resting on the ground midway between rows of plants. The skid units may be elevated by swinging the skids 72 back with an arm 58 and a draw bar 59, as in Figs. 1 and 3.

Fig. 7 is an enlarged view of a rotary hoe unit, similar to those shown in Figs. 2 and 5, which includes a greater number of the tine units. The construction otherwise is the same as that shown in Figs. 2 and 5 of the drawings, and may be used in the apparatus of Figs. 1 to 5.

The apparatus described above in connection with the drawings, is preferably used according to the present invention in carrying out the improved methods of flame blocking and cultivation of growing crop plants. The preferred process includes the cross flame blocking of rows of growing crop plants by using the apparatus assembled in the manner illustrated in Figs. 1, 2 and 3 of the drawings. This preferred process may be combined with the steps of between-row flaming, and row cultivation, by means of the rotary hoe units, these steps being carried out simultaneously with the apparatus rearranged on a different spacing, as shown, for example, in Fig. 4 of the drawings.

When it is realized that the hand blocking and hand cultivation of young crop plants require an enormous amount of time to handle any considerable acreage, it will be appreciated that the method and apparatus of the present invention will be of inestimable value during the early stages of plant growth. The apparatus shown in Fig. 1 may be of any convenient or desired width, so that a considerable number of flame blocking and rotary hoe cultivators may be used, thereby covering a relatively large acreage in a relatively short time. Similarly, a very wide apparatus may be employed in carrying out the between-row flaming and row cultivation with the rotary hoes. These improvements will obviously contribute to the growing of more crops and at less expense per acre than has been possible in the past.

From the foregoing description, it will be apparent that certain modifications and changes may be made in the process and apparatus of the present invention without materially changing their effectiveness and the results to be obtained. Such changes are contemplated as coming within the scope of the invention as defined by the appended claims.

What I claim is:

1. The improved method of flame cultivation of growing crop plants, which comprises causing a plurality of spaced flames to pass along between the rows of growing crop plants while shielding the plants from contact by the flames and hot gases resulting therefrom, and flame chopping the rows of growing crop plants by causing a plurality of spaced flames to pass crosswise of the rows of growing crop plants while shielding the retained plants in each row from contact by the flames and hot gases therefrom.

2. The method as defined by claim 1 in which the rows of growing crop plants shielded from the flames passing along between the rows are simultaneously cultivated and weeded.

3. The method as defined by claim 1 in which the crop plants retained and shielded from the flames in the cross-chopping operation are simultaneously cultivated and weeded.

4. The method as defined by claim 1 in which the crop plants are simultaneously mechanically weeded and cultivated with each flaming operation.

5. The method of flame cultivation of growing crop plants, which comprises causing a plurality of spaced parallel flames to pass along the rows of growing crop plants with a flame between adjacent rows, shielding the crop plants from contact by the flames and hot gases, thereafter chopping the rows of growing crop plants by causing a plurality of spaced parallel flames to pass crosswise of the rows, shielding the retained crop plants from the flames during the chopping operation, and thereafter causing a plurality of spaced flames to pass lengthwise of the rows of growing crop plants with a flame between adjacent rows of plants while shielding the rows of crop plants from contact by the flames and gases resulting therefrom.

6. In a cultivator for the cultivation of row crops, the combination of a wheeled vehicle comprising a pair of spaced supporting beams, a pair of spaced crossbars attached to said beams, a plurality of spaced flame cultivation units carried by said crossbars, and rotary hoe units carried by said crossbars, said flame cultivation units and rotary hoe units alternating with each other.

7. In a cultivator for the cultivation of row crops, a carrier comprising a pair of spaced beams, a pair of spaced bars mounted crosswise of said beams and attached thereto, a second pair of spaced bars mounted parallel to, supported by, and below said first-mentioned bars, a plurality of cultivation units mounted on said last-mentioned bars including alternating flame and rotary hoe units, and a shield between each flame and rotary hoe unit adapted to shield the area of each rotary hoe unit from contact by the flames from the flame units.

8. In a cultivator for the cultivation of row crops, a carrier comprising a pair of spaced beams, a pair of spaced bars mounted crosswise of said beams and attached thereto, a plurality of cultivation units carried by said bars and comprising alternate flame and rotary hoe units, each flame unit comprising a burner and a cowling under which the burner is directed, the cowling being arranged to direct the flame and gases from the burner downwardly onto the area covered by the flame unit.

9. In a cultivator for the cultivation of row crops, a carrier having mounted thereon a plurality of alternate flaming and rotary hoe cultivating units separated from each other by a shield plate adapted to prevent flames and hot gases from the flaming units from entering the area occupied by the rotary hoe units, each rotary hoe unit including a plurality of curved tines mounted on a floating shaft operating in opposite arcuate slots in adjacent shield plates, and each flaming unit including a burner and a cowling for directing the flame toward the ground between adjacent shield plates.

10. In a machine for the cultivation of row crop plants, a carrier having mounted thereon a plurality of alternate flaming and cultivating units, each flaming unit including a burner, a cowling for directing the flame and gases from the burner toward the ground covered by the flaming unit, and a baffle in front of the burner and connected to the cowling for directing the flame from the burner to the space under the cowling.

11. In a cultivator for the cultivation of row crops, a carrier having mounted thereon a plurality of alternate flaming and cultivating units separated from each other by a shield plate adapted to prevent flames and hot gases from entering the area occupied by the cultivating units, each flaming unit including a burner and a cowling over the burner discharge for directing the flame toward the ground between adjacent shield plates.

DAVID M. L. FORBES.

REFERENCES CITED

The following references are of record in the file of this patent:

UNITED STATES PATENTS

| Number | Name | Date |
|---|---|---|
| 439,176 | Pace | Oct. 28, 1890 |
| 513,817 | Nehrmeyer | Jan. 30, 1894 |
| 899,404 | Iten | Sept. 22, 1908 |
| 1,021,530 | Johnson | Mar. 26, 1912 |
| 1,088,969 | Cox | Mar. 3, 1914 |
| 1,193,791 | Jensen | Aug. 8, 1916 |
| 1,436,958 | Hebert | Nov. 28, 1922 |
| 1,458,070 | Long | June 5, 1923 |
| 1,571,481 | Kasmeier | Feb. 2, 1926 |
| 1,754,083 | Collins | Apr. 8, 1930 |
| 1,760,336 | Banjamin | May 27, 1930 |
| 1,910,776 | Schwanbeck | May 23, 1933 |
| 1,956,697 | Rognerud | May 1, 1934 |
| 2,327,204 | McLemore | Aug. 17, 1943 |
| 2,414,507 | Callahan | Jan. 21, 1947 |

FOREIGN PATENTS

| Number | Country | Date |
|---|---|---|
| 2,224 | Great Britain | 1855 |